United States Patent [19]

Gundy

[11] Patent Number: 5,360,241

[45] Date of Patent: Nov. 1, 1994

[54] UNIVERSAL SADDLE TEE FOR PIPES

[75] Inventor: William P. Gundy, Milford, N.H.

[73] Assignee: NPC, Inc., Milford, N.H.

[21] Appl. No.: 122,737

[22] Filed: Sep. 16, 1993

Related U.S. Application Data

[63] Continuation-in-part of Ser. No. 992,708, Dec. 18, 1992, abandoned, which is a continuation-in-part of Ser. No. 741,751, Aug. 7, 1991, abandoned.

[51] Int. Cl.⁵ .................. F16L 25/00; F16L 41/12
[52] U.S. Cl. .................... 285/197; 285/199; 285/915
[58] Field of Search ............. 285/197, 198, 199, 915

[56] References Cited

U.S. PATENT DOCUMENTS

| | | | |
|---|---|---|---|
| 2,736,335 | 2/1956 | Webber | 137/318 |
| 3,188,121 | 6/1965 | Cude et al. | 285/197 |
| 3,355,193 | 11/1967 | Craig et al. | 285/197 |
| 3,649,055 | 3/1972 | Nilsen | 285/197 |
| 3,814,156 | 6/1974 | Bachmann et al. | 260/29.6 R |
| 4,078,833 | 3/1978 | Carter | 285/24 |
| 4,494,780 | 1/1985 | Burnett | 285/199 |
| 4,606,558 | 8/1986 | Davidson | 285/21 |
| 4,894,521 | 1/1990 | Evans | 219/535 |
| 4,966,397 | 10/1990 | McKinnon | 285/197 |
| 5,020,832 | 6/1991 | Coblentz | 285/197 |

FOREIGN PATENT DOCUMENTS 852326 10/1960 United Kingdom ............... 285/197

Primary Examiner—Eric K. Nicholson
Attorney, Agent, or Firm—Pearson & Pearson

[57] ABSTRACT

A saddle tee assembly for connecting a lateral pipe to a main pipe. The saddle tee assembly includes a saddle tee boot, a collar means and clamping device. The saddle tee boot has a flexible saddle and cylindrical hollow tee section. The saddle attaches to a main pipe; the hollow tee section receives the lateral pipe in a first hollow section. A section hollow section with an internally tapered surface seals against the end of the lateral pipe. A flexible collar overlies the saddle about the periphery of the hollow tee. A clamping device circumscribes the main pipe to apply tension along the circumference of the main pipe to the collar thereby to force the collar into the saddle and the saddle against the main pipe. A water-activated mastic for improved sealing characteristics may be interposed between the saddle and the main pipe.

38 Claims, 7 Drawing Sheets

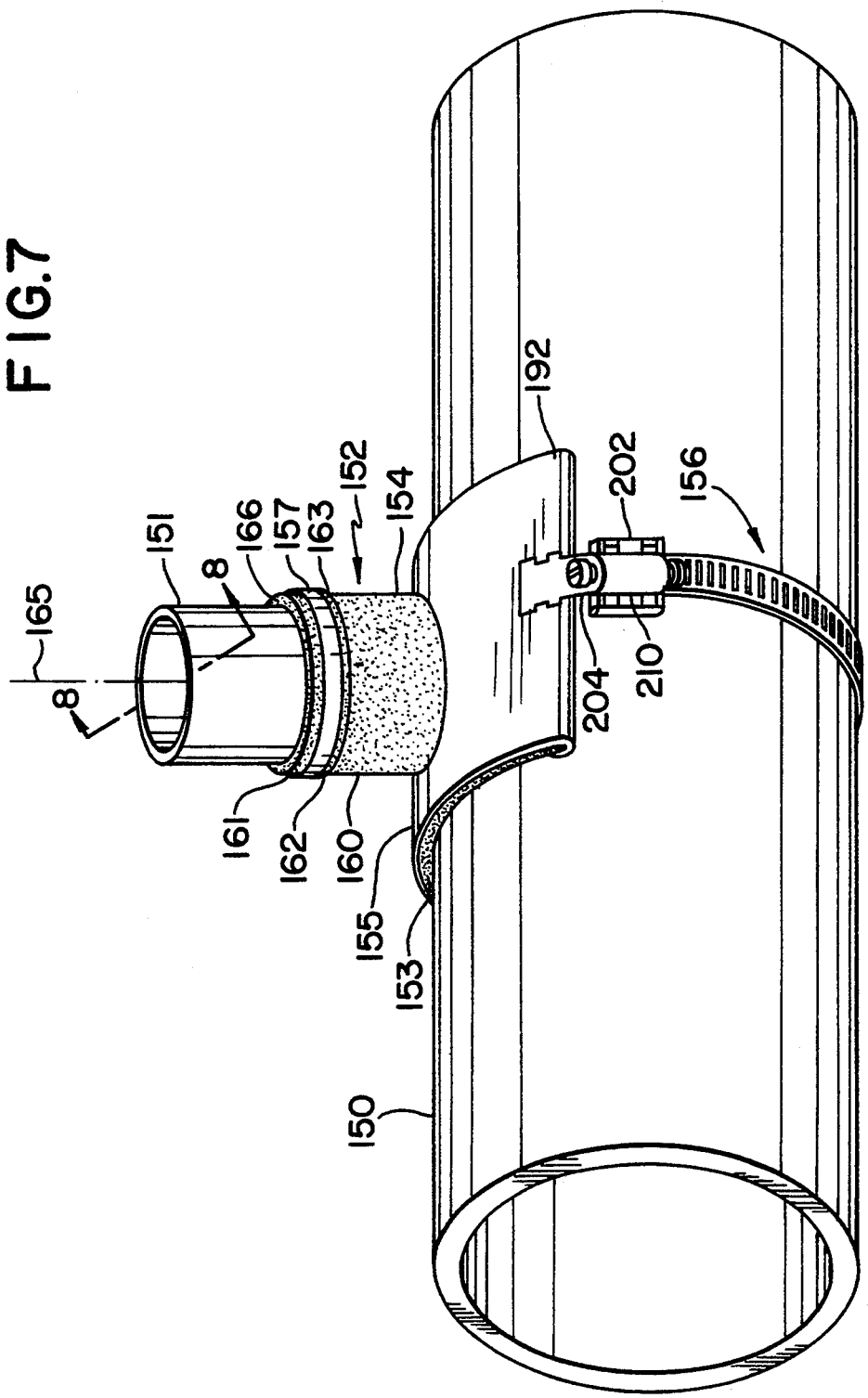

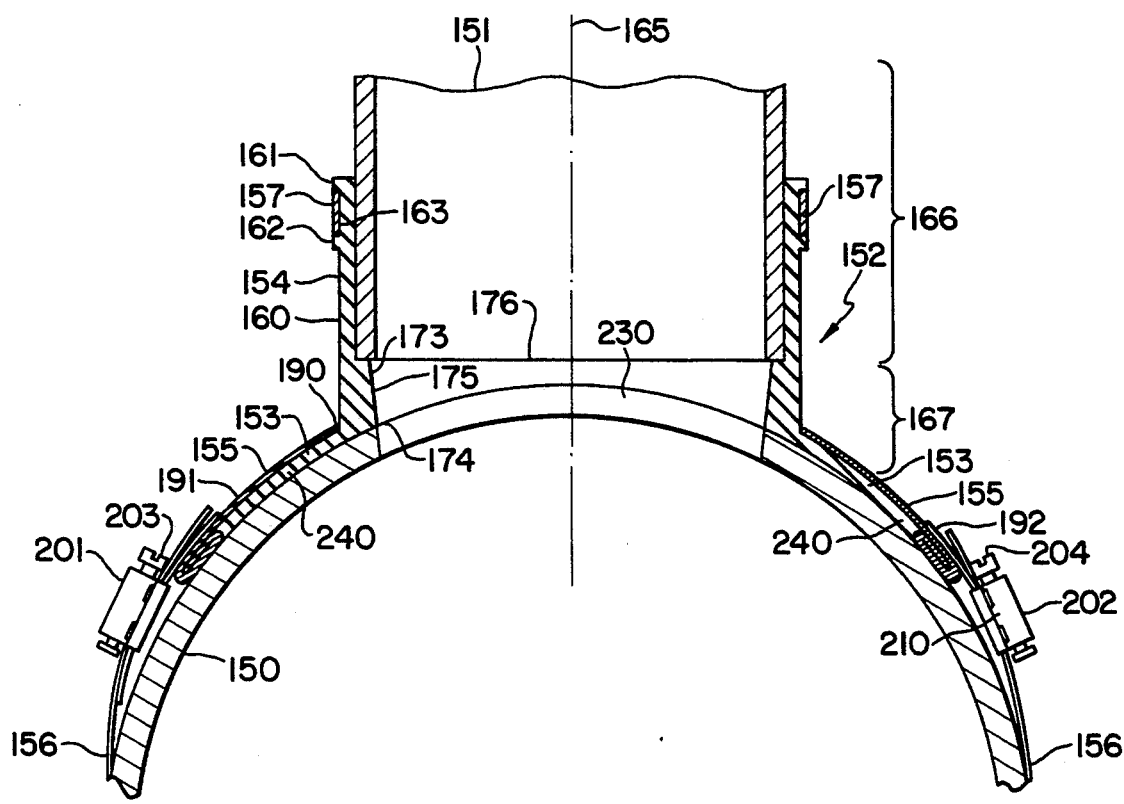
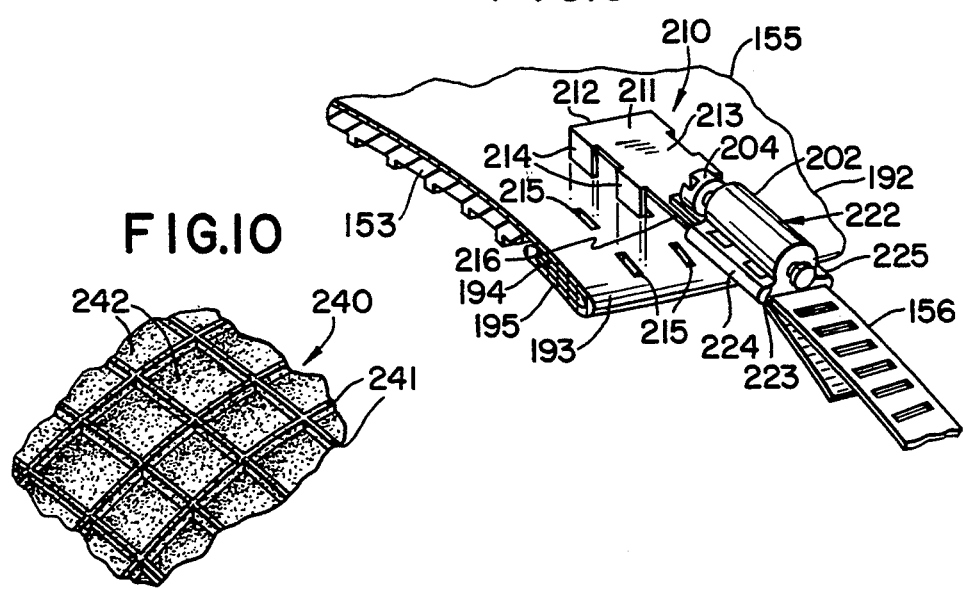

UNIVERSAL SADDLE TEE FOR PIPES

CROSS REFERENCE TO RELATED APPLICATION

This is a continuation-in-part of my copending application Ser. No. 07/992,708 filed Dec. 18, 1992 (now abandoned) for a Universal Saddle Tee for Pipes that is a continuation-in-part of my then copending application Ser. No. 07/741,751 filed Aug. 7, 1991 for a Universal Saddle Tee (now abandoned).

BACKGROUND OF THE INVENTION

1. Field of the Invention

This invention generally relates to the interconnection of pipes and more specifically for fittings or apparatus for connecting individual pipes into a pipe system.

2. Description of Related Art

Many pipe systems include a main pipe and a plurality of subsidiary pipes that in various applications may be called service, lateral or branch pipes. In the following discussion the phrase "lateral pipe" means any such subsidiary pipe that connects to a main pipe at a tap hole through the main pipe wall. In some systems liquid flows from the main pipe, as a supply pipe or manifold, to lateral pipes; in others, from lateral pipes to the main pipe as a collector or return pipe. Such pipe systems may be installed above or below ground. The pipes may be formed of a wide variety of materials including plastics (polyvinylchloride is typical), thermoplastics, metal and concrete.

It is important to connect such lateral and main pipes with a leakproof connection. In sewer systems, for example, such connections are required to prevent sewage from leaking into the ground and, as importantly, ground water from infiltrating the sewer system. It also important the apparatus for making such connections be simple to install in the field, particularly in pipe systems having pipes of large diameter and weight.

This invention particularly relates to a class of pipe fittings called "saddle tee" fittings. Basically a saddle tee fitting has a saddle portion for overlying a portion of a main pipe and a cylindrical extension, called a "tee", that receives the end of a lateral pipe. The saddle is intended to form a seal with the main pipe and the tee, with the lateral pipe. The tee may extend at any angle from an axis of the main pipe, angles of 90°, 60° and 45° being typical.

There are a number of features that should characterize a saddle tee fitting. The fitting must produce a leakproof seal to prevent flow both into and out of the pipe system (i.e., to prevent leaking and ground water filtration). The fitting must be durable and withstand the environment. The fitting must be easy to install, preferably without any requirement for special tooling at an installation site. The fitting should not impede or otherwise alter the flow characteristics in the pipe system. One single saddle tee fitting sized for a given lateral pipe should connect to main pipes of different diameters in order to reduce inventory requirements.

U.S. Pat. No. 2,736,335 of Webber for "Tapping and Cutoff Connection to Plastic Fluid Pressure Main" discloses a saddle fitting for plastic pipe. A saddle connects to a main pipe by suitably wetting counterfacing surfaces with an adhesive, typically a plastic solvent, and by clamping the saddle to the pipe until a plastic bond forms.

U.S. Pat. No. 4,606,558 to Davidson for "Plastic Pipe Fitting" discloses a saddle fitting with a perforated saddle and a tee that extends from the saddle. During assembly a solvent coats the interface of the saddle and the main pipe. A clamping tool attaches to bosses at each end of the saddle to clamp the saddle firmly to the main pipe until plastic flows through the perforations and forms rivet-like structures that permanently bond the saddle to the pipe. Then the clamping tool can be removed.

U.S. Pat. No. 3,649,055 to Neilson for "Clamp Fitting With Seal For Plastic Pipe" discloses a fitting with a saddle body that snaps to a main pipe after counterfacing surfaces of the pipe and saddle are coated with a plastic or adhesive. When the saddle snaps onto the pipe, the saddle provides the necessary clamping forces to position the saddle until the solvent or adhesive sets. An O-ring or similar sealing device in a circumferential groove of the saddle provides a seal around a tap hole through the main pipe.

In U.S. Pat. No. 4,894,521 to Evans for "Electric Heating Element For Fusing Thermoplastic Materials" a saddle contains an integral heating element. The saddle seals to a pipe of thermoplastic materials when the element heats. This produces a permanent seal between the saddle and the pipe.

Each of the foregoing references discloses saddle tee fittings in which a permanent bond forms between the saddle and the main pipe. This bond depends upon the ability of the materials in the pipe and saddle to commingle or fuse. Each requires special materials in the form of solvents or heaters. It is not possible to obtain such a joint in sewer systems comprising concrete or ductile iron pipes. Even if it were possible to make such joints in these materials, the requirements for special tools and materials would minimize the desirability of the joints with respect to sewer systems.

U.S. Pat. No. 3,188,121 Cude et al for "Cable Sheath Pressure Tap Fitting" discloses a saddle tee structure that enables the formation of a tap for a high pressure line containing electrical conductors or the like. The saddle tee fitting is rubber or plastic while the pipe has an outer sheath of lead or other weather resistant material. The saddle includes an underlying gasket preferably with an adhesive backing for adhering to the pipe. A tape wrap overlies the saddle portion and pipe thereby to hold the saddle against the pipe. In this structure a small gap exists in the tape along the axially extending edges of the saddle that are coextensive with the tee structure. In the Cude et al patent this is a small gap. If this approach is applied to other pipe systems, that gap will approximate the diameter of the lateral pipe gap and can be up to 4" or more. It becomes difficult to maintain a seal across gaps of these proportions. Cude et al also suggest substituting hose clamps for the tape wrap. Such a substitution would not reduce any gap; indeed the gap might increase in length.

British Patent No. 852,326 to Collins for "Improvements in Pipe Connections" discloses another embodiment of a saddle tee fitting. The fitting comprises an integral base and flange formed of plastic or the like. The tee portion of this fitting is internally or externally threaded. Given the materials suggested for construction, a requirement for a separate sealing gasket and the use of rigid straps (cast iron is preferred), it must be concluded that this fitting is rigid. It does not distort to any significant or practical degree. Consequently, it is only possible to connect a given fitting to a main pipe of a given size. Moreover, this structure requires a significant number of component parts that are specially formed thereby increasing the costs of the fitting and the complexity of installation.

U.S. Pat. No. 4,494,780 to Burnett for a "Liquid Piping Saddle Assembly Connecting A Branch Pipe to a Main Pipe" discloses a generally cylindrical elastomeric tee with one end preformed to attach to a main pipe of different sizes. A shoulder in the exterior of the tee provides a bearing surface for a rigid collar or casting. A flexible strap, when tightened, pulls the casting over the tee against the shoulder to drive the tee against the main pipe and produce a seal. This process deforms the tee adjacent the main pipe. Moreover, the internal structure of the tee includes another shoulder that spaces the end of a lateral pipe from the main pipe. Consequently a pocket forms that can collect debris and eventually restrict flow through the connection.

U.S. Pat. No. 4,966,397 of McKinnon for "Flexible Pipe Saddle" discloses a flexible saddle tee fitting that uses spaced hose clamps to affix a saddle to a pipe. As described later with respect to FIGS. 1 and 2, this saddle tee fitting includes a rectangularly shaped saddle that flexes about an axis that is coincident with the longitudinal main pipe axis, but is relatively rigid in other directions, particularly along the axially extending edges of the saddle parallel to the main pipe axis. Two clamping bands encircle the main pipe at the axial ends of the saddle. The spaced clamping bands leave a gap along the axial edge of the saddle. Although this edge contains a stiffening device, it is still difficult to guarantee seal integrity along this entire gap.

U.S. Pat. No. 5,020,832 to Coblentz for a "Flexible Pipe Saddle" discloses a saddle tee assembly with a flexible resilient polymer saddle tee, an overlying flexible metallic skirt and a plurality of clamping bands. The saddle tee has a flexible skirt portion that conforms to a main pipe about an opening and a cylindrical tee portion for receiving a lateral pipe. A radially-extending, bevelled annular shoulder formed inside the tee receives the end of the lateral pipe. Three clamping bands encircle the flexible metal skirt and main pipe to effect a seal.

Saddle tee fittings for attachment to differently sized main pipes, like those described in the Burnett, McKinnon and Coblentz patents, typically are molded to a nominal pipe size. For example a saddle tee for receiving a six-inch lateral pipe might be molded for attachment to a ten-inch main pipe as a nominally sized pipe even though the saddle tee could be connected to larger and smaller main pipes. When a saddle tee is attached to a main pipe of nominal size, the tee portion forms a cylindrical passage. Internal, radial or bevelled shoulders remain in a radial plane, so they contact the end of the lateral pipe. Moreover, the tee is readily sealed to the lateral pipe when it is cylindrical.

When the saddle tee is fitted to main pipes of different sizes, the tee portion distorts into an oval shape. As the main pipe diameter increases from the nominal diameter, the tee deforms into an oval cross section with a major axis parallel to an axis of the main pipe. As the main pipe diameter decreases from the nominal diameter, the tee deforms into an oval cross section with a major axis at right angles to the axis through the main pipe. Such distortions make it more difficult to guarantee a seal between the tee and the lateral pipe. These distortions produce concave or convex distortions in the internal, radial or bevelled, shoulder that normally engages the end of the lateral pipe. Consequently axial gaps exist between the shoulder and lateral pipe. These gaps can trap entrained solid materials flowing through the pipe and eventually alter or impede flow.

SUMMARY

Therefore it is an object of this invention to provide a leakproof saddle tee assembly adapted for a wide variety of applications, particularly for connecting lateral and main pipes.

Another object of this invention is to provide a leakproof saddle tee assembly adapted to be sized for a given lateral pipe with a tee that facilitates sealing to the lateral pipe.

Still another object of this invention is to provide a leakproof saddle tee assembly that can be installed and removed from a pipe using simple procedures and common tools.

Yet another object of this invention is to provide a leakproof saddle tee assembly that has a saddle adapted for connection to main pipes having a variety of diameters and that does not alter the flow characteristics in the pipe system.

In accordance with this invention a saddle tee assembly interconnects a first or lateral pipe to a second or main pipe to enable flow through an access or tap formed through a wall of the main pipe. The saddle tee assembly comprises a saddle tee boot with a flexible sealing saddle portion that overlies the surface of the second or main pipe about the periphery of the tap. A first hollow section receives one end of the first or lateral pipe. A second hollow section connects the first hollow section to the saddle portion to form a continuous passage through the saddle tee assembly along an axis that is coaxial with an axis through the lateral pipe. This second hollow section is smoothly tapered internally to provide a transition between the passage through the first hollow section and the hole in the main pipe. A flexible metal collar overlies the saddle portion about the periphery of the hollow tee portion. A main clamp circumscribes the second pipe and connects to the collar at the first and second positions. As the main clamp applies a force in tension to the collar, it conforms the collar and the saddle portion to the main pipe to produce a seal between the flexible saddle portion and the main pipe that extends about the periphery of the tap.

In accordance with another aspect of this invention, a lateral pipe connects to a main pipe at a tap through a wall of the main pipe by locating a saddle tee boot having a flexible saddle portion and a hollow tee portion extending from the saddle portion against the main pipe in alignment with the tap hole. A flexible collar means overlies the base portion about the periphery of the extension. A force in tension applied circumferentially to the collar means conforms the collar and the saddle portion to the main pipe thereby to produce the seal. A final connection is made by clamping an end of the tee portion to the lateral pipe. The end of the lateral pipe is sealed to a first hollow section and engages the internally tapered surface of a second hollow section intermediate the first hollow section and the saddle portion.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 7 is a perspective view of another embodiment of a saddle tee assembly constructed in accordance with this invention;

FIG. 8 is a partial cross-section taken generally along lines 8—8 in FIG. 7;

FIG. 9 is a detailed view of a portion of the saddle tee assembly of FIG. 7;

FIG. 10 is a detailed perspective view of another portion of the saddle tee assembly shown in FIG. 7;

DESCRIPTION OF ILLUSTRATIVE EMBODIMENT

Figure 1:
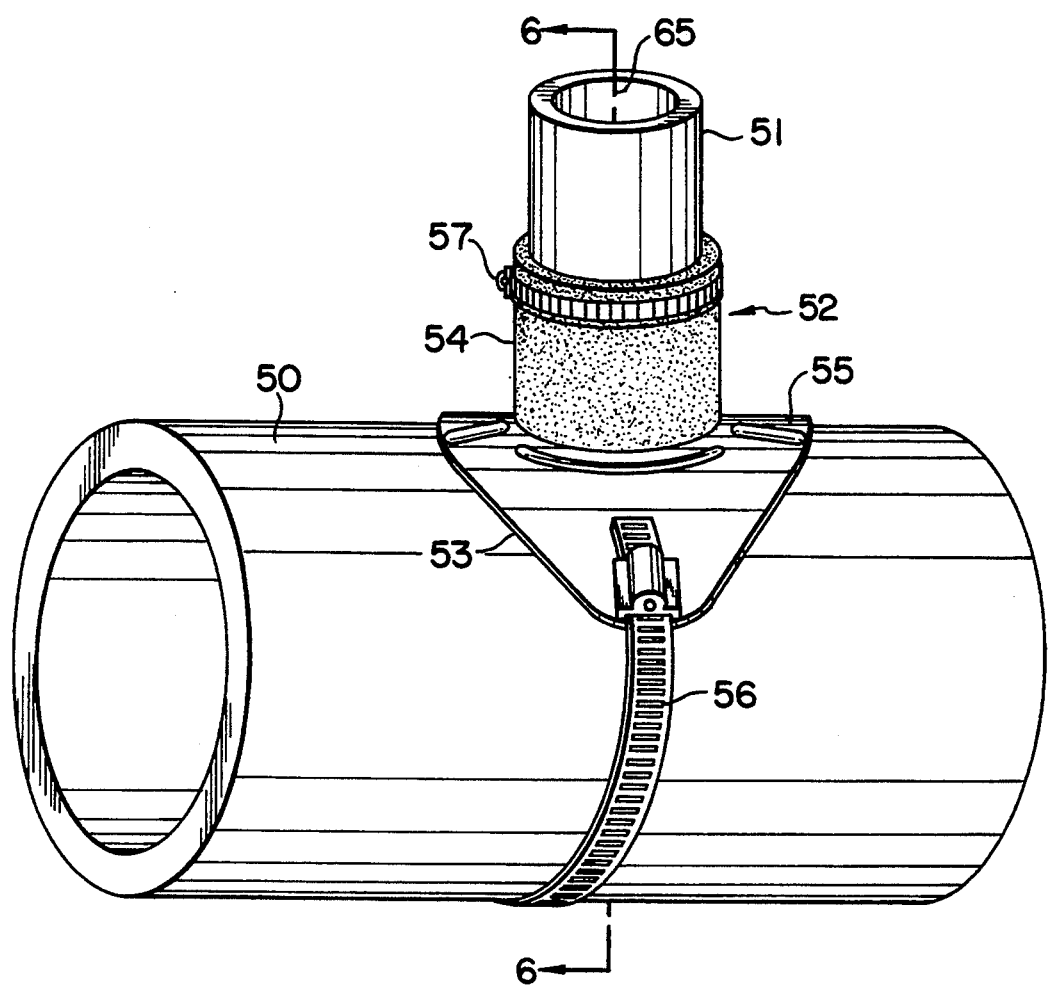
FIG. 1 is a perspective view of a saddle tee assembly constructed in accordance with this invention for connecting a lateral pipe to a main pipe.

FIG. 1 discloses a joint between a main pipe 50 and lateral pipe 51 that utilizes one embodiment of a saddle tee boot 52 constructed in accordance with this invention. A flexible saddle 53 on the boot 52 contacts the surface of the main pipe 50 and a hollow tee 54 receives an end of the lateral pipe 51. A collar 55 overlies the saddle 53. A clamping band 56 circumscribes the main pipe 50 and connects to the collar 55 to apply a force in tension that causes the collar 55 to clamp the saddle 53 against the main pipe 50 in a sealing relationship. As the collar 55 overlies the saddle 53 completely about the periphery of the hollow tee 54, the collar 55 produces a continuous seal about a tap hole or access aperture through the main pipe 50 that aligns with the lateral pipe 51. For concrete and other pipes with porous surfaces, a mastic applied between the saddle 53 and the main pipe 50 assures a good seal. A clamping band 57 produces a seal between the hollow tee 54 and the lateral pipe 51.

Figure 2:
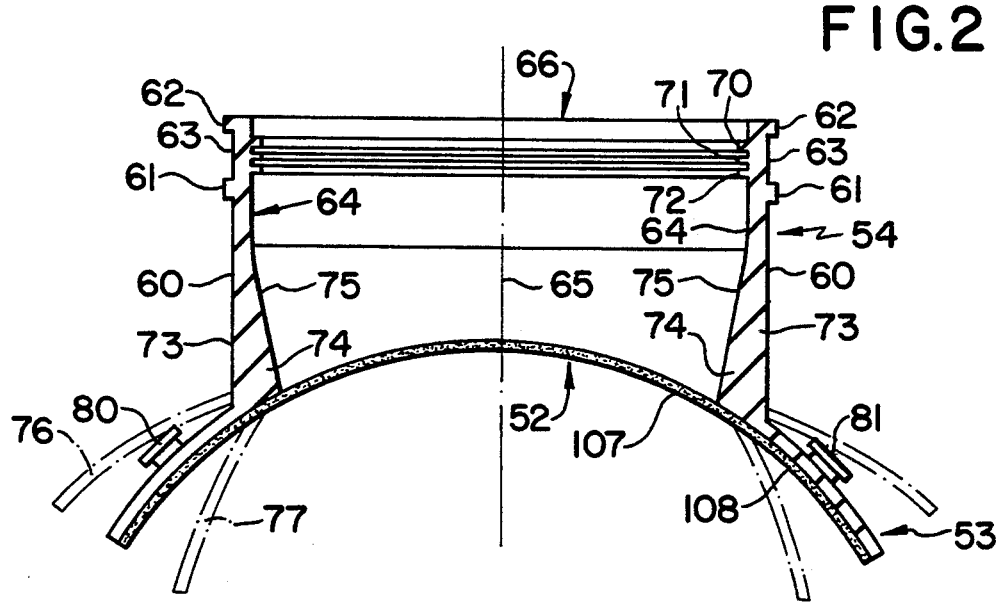
FIG. 2 is a cross section of saddle tee boot constructed in accordance with this invention and used in the assembly shown in FIG. 1.
Figure 3:
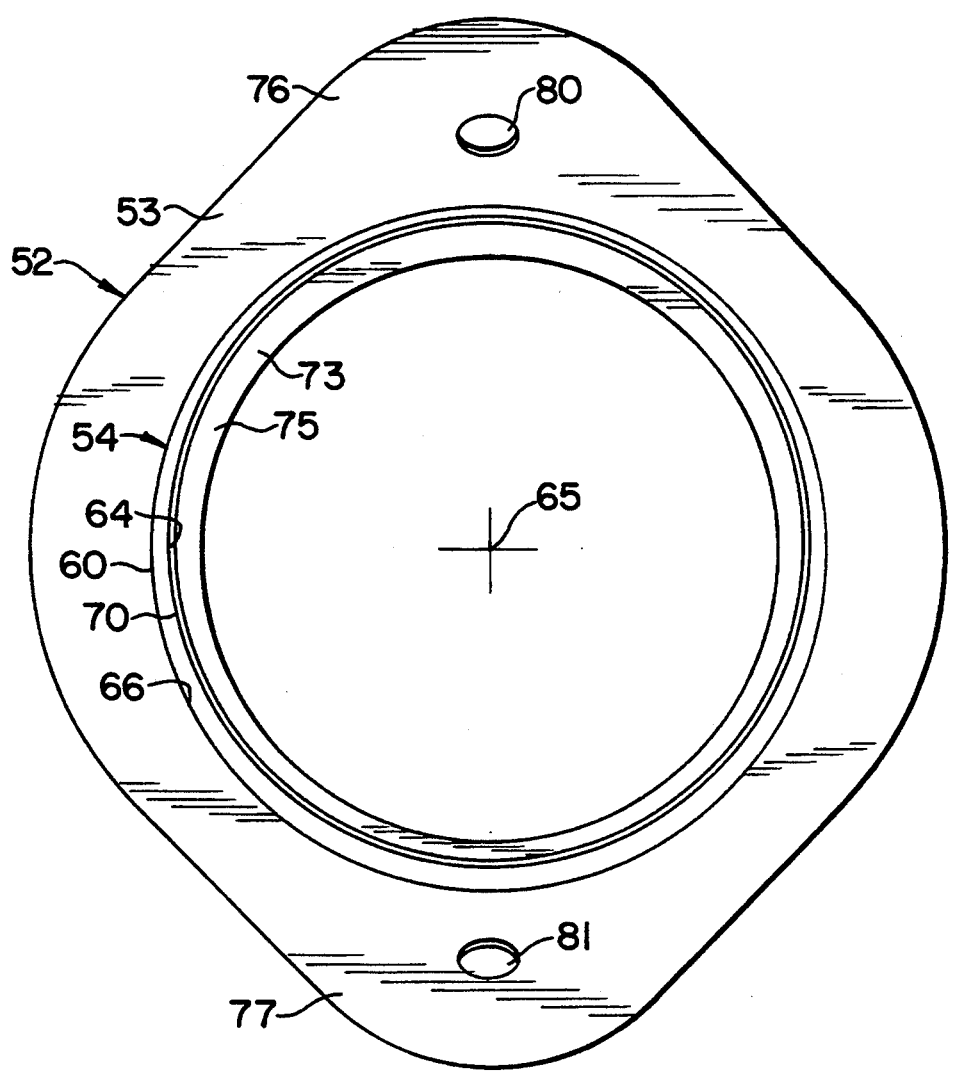
FIG. 3 is a plan view of the saddle tee boot shown in FIG. 2.

FIGS. 2 and 3 disclose the detailed construction of the saddle tee boot 52 including the flexible saddle 53 and the hollow tee 54. The hollow tee 54 has an outer right cylindrical surface 60 with spaced circumferentially extending outer ribs 61 and 62 formed remotely from the saddle 53 in a first hollow section. The ribs 61 and 62 define a circumferential groove 63 for supporting the clamping band 57 in FIG. 1. The hollow tee 54 has an interior cylindrical surface 64 that is coaxial with an axis 65 that extends between a tap hole in the main pipe and the center of a remote end 66 of the hollow tee 54. The axis 65 is oriented at right angles to the main pipe axis in FIGS. 1 through 3; other orientation angles can also be used to permit other lateral pipe orientations. For example, an orientation of 60° produces a product called a wye fitting.

A plurality of circumferentially extending rectangular sealing ribs 70, 71 and 72 on the surface 64 engage the outer surface of the lateral pipe. The sealing ribs 70 through 71 are aligned with the groove 63 so clamping forces bear directly on the ribs 70 through 72 and displace them against the surface of the lateral pipe.

The walls of the hollow tee 54 become progressively thicker in a second hollow section extending from a location approximately midway along the axis 65 to produce a tapered section 73 with an end 74 of maximum thickness at the saddle 53. The inner diameter at the end 74 corresponds to the inner diameter of the lateral pipe. The tapered section 73 thereby defines a conical surface 75 that reduces the passage along the axis 65 from a diameter corresponding to the outer diameter of a lateral pipe at the surface 64 to an inner diameter corresponding to the inner diameter of the pipe. As described later, the tapered section 73 seats a lateral pipe and provides a transition that does not alter the flow characteristics between the main pipe and the lateral pipe. In addition the tapered section 73 facilitates the adaptation of the hollow tee for accommodating variations that can occur in the nominal diameters of a lateral pipe and small angular offsets in the direction of the pipe along the axis 65.

As shown in FIG. 2, the saddle 53, being thin and relatively flexible, can accommodate a wide range of differently sized main pipes by being flexed between positions shown by the dashed lines 76 and 77 in FIG. 2. The flexibility of the saddle 53 and the use of the tapered section 73, particularly the stiffening action provided at the thicker ends 74, also allows these variations to occur without materially altering the cylindrical cross section of the hollow tee 54.

Still referring to FIGS. 2 and 3, the saddle 53 contains two integrally molded rivet-like structures 80 and 81 that align along a circumference of the main pipe on either side of the hollow tee 54. As described later, the structures 80 and 81 capture and position the collar 55.

Figure 4:
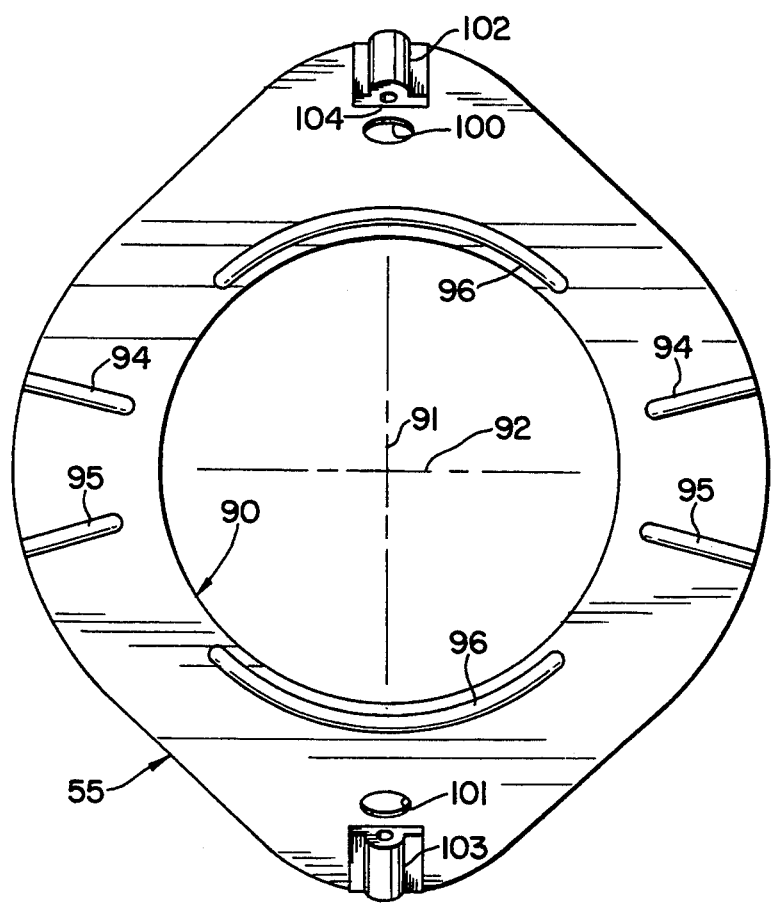
FIG. 4 is a plan view of a collar that overlies the boot means of FIGS. 2 and 3 in accordance with this invention as shown in FIG. 1.
Figure 5:
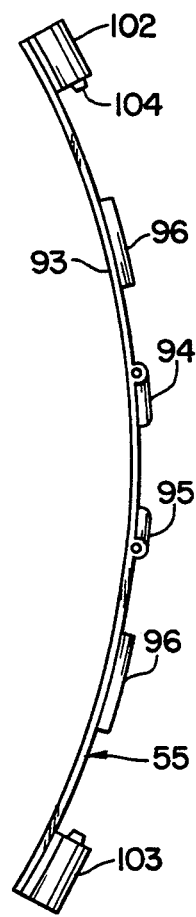
FIG. 5 is an edge view of the collar shown in FIG. 4.

Now referring to FIGS. 4 and 5, the collar 55 comprises a thin metal stamping, preferably of stainless steel, with an aperture 90 that conforms to the outer diameter of the hollow tee 54. The stamping operation forms the collar 55 with a radius of curvature as shown in FIG. 5 that corresponds to a radius of curvature molded into the saddle. The collar 55, like the saddle 53, has a generally oval shape along a major axis 91 and a minor axis 92. A plurality of reinforcing ridges in the collar 55 provide strength and assure that an inner surface 93 retains a constant radius as it clamps to a main pipe of any size. More specifically, radially extending reinforcing ridges 94 and 95 are formed on opposite sides of the minor axis 92 along a radii from the intersection of the axes 91 and 92. Two circumferentially extending ridges 96, that are proximate the aperture 90 and centered on the major axis 91, complete this structure.

The collar 55 has two apertures 100 and 101 located outside the ridges 96 and on the axis 91. The apertures 100 and 100 align with the rivet-like structures 80 and 81 shown in FIGS. 2 and 3 and capture those structures. Thus, a collar 55 can be assembled to the saddle tee boot 53 at the factory and shipped as a subassembly to the site thereby minimizing on-site assembly requirements.

The collar 55 also supports two clamp tensioning devices 102 and 103 along the axis 91 and at the edges of the collar 55. These are standard mechanisms for accepting a clamping band such as found with conventional hose clamps. Rotation of a captured bolt, such as a bolt 104 associated with the tension device 102, transfers the band through the tension device 102 along the axis 91 either to tighten or loosen the band.

As will now be apparent, the saddle tee assembly constructed in accordance with this invention is sized for a particular diameter lateral pipe. The combination of the flexible saddle 53 and the metal collar 55 allows a saddle to conform to main pipes having a wide variety of diameters without deforming the hollow tee 54. This reduces inventory requirements and makes it easier to obtain a leakproof seal at the lateral pipe. The rivet-like structures 80 and 81 and the apertures 100 and 101 enable factory assembly of the collar 55 and the saddle tee boot 52. Only three pieces are shipped to an installation site, namely: (1) the assembled saddle tee boot and collar, (2) the main clamping band 56 and (3) the clamping band 57. These components also are easily assembled and installed on site without special tools.

Figure 6:
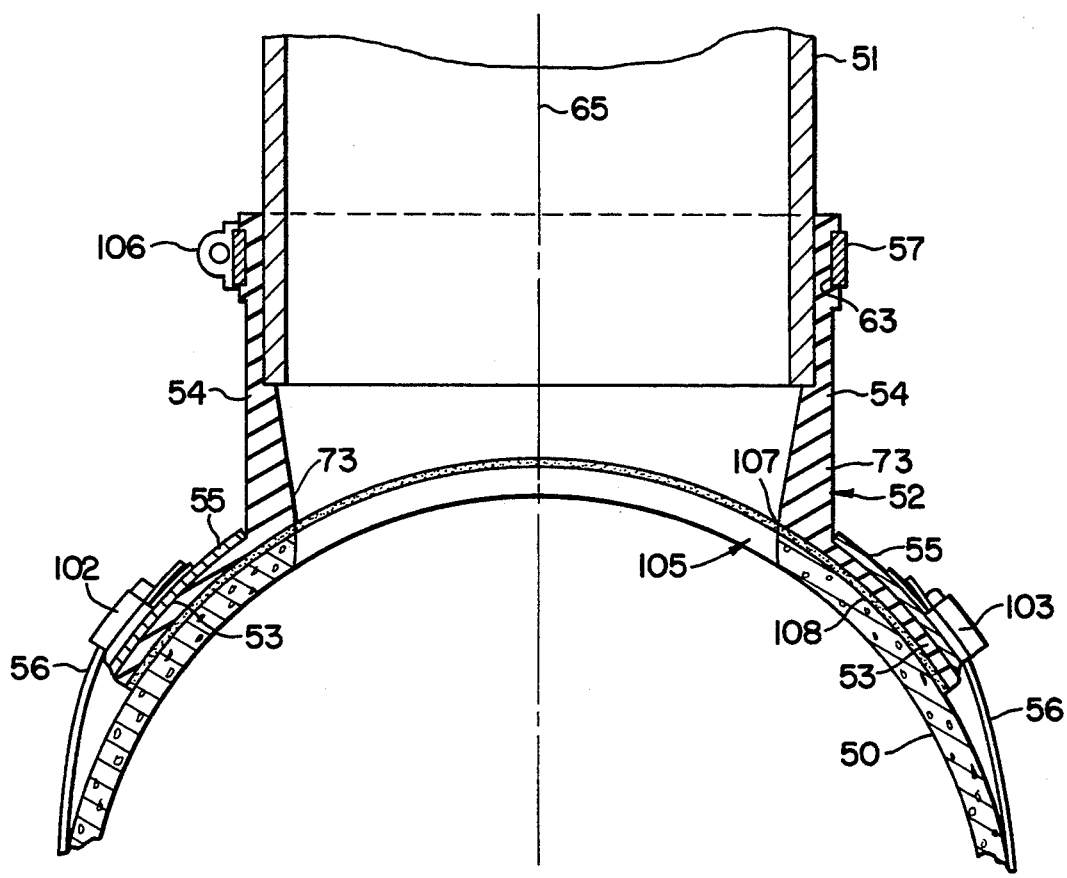
FIG. 6 is a partial cross sectional view taken generally along lines 6—6 of FIG. 1.

FIG. 6 shows a main pipe 50 with a tap hole 105. In accordance with another aspect of this invention, the tap 105 is nominally at the inner diameter of the lateral pipe 51. As a result, even given an accumulation of tolerances in hole and pipe sizes, it is not possible for a lateral pipe to extend into the main pipe passage and impede its flow characteristics. Even nominal pipe size variations will not affect flow because the tapered section 73 tends to conform to the inner diameters of both the main pipe 50 and the lateral pipe 51.

As shown in FIG. 6 as a lateral pipe 51 is installed, it moves along the axis 65 until an end contacts the tapered section 73. Additional displacement of the lateral pipe 51 causes the material in the tapered section 73 to deform around the end of the lateral pipe and define a smooth, interconnecting flow passage surface between the end of the lateral pipe 51 and the main pipe 50. Even if the saddle 53 flexes to conform to a main pipe of a different diameter, the resiliency of the tapered section 73 maintains continuous contact with the end of the lateral pipe 51. No axially extending gaps will exist at the end of the lateral pipe 51.

The clamping band 57 located in the groove 63 includes a tensioning nut assembly 1076 for tightening the band 57 to force the sealing ribs 70, 71 and 72 against the surface of the lateral pipe 51 thereby to produce a leakproof seal at this position.

When the saddle tee boot 52 and collar 55 are positioned on the pipe 50, the clamping band 56 is threaded into the tensioners 102 and 103 and tightened to produce a circumferentially acting force that applies tension to the collar 55. This causes the collar 55 to bear evenly against the saddle 53 forcing it against the main pipe 50 to produce a seal completely around the tap hole.

When concrete or ductile iron pipes or the like are being interconnected, it may be desirable to form an adhesive seal between the saddle 53 and the main pipe 50. It has been found that a water-activated mastic can be applied to form a coating 107 (FIGS. 2 and 6) on an inner surface 108 of the saddle 53 at the factory. At installation sites water is always available to wet the coating and activate the mastic before clamping the saddle 53 to a main pipe. More specifically, it is possible to coat the inner surface 108 with an asphalt-based mastic and then coat the mastic with a polyvinyl alcohol, or other water soluble, film to preserve the mastic during storage and shipping. Installers have two options.

Under one option, the assembly of the saddle tee 52 and collar 55 is mounted to the main pipe 51 and tightened. Any liquid that tends to penetrate the mechanical seal dissolves the film it contacts and activates the mastic to form an adhesive seal. Alternatively, the installers can wet the entire surface prior to mounting so all the mastic is activated to seal the entire saddle 53 to the main pipe.

FIG. 7 discloses a joint between a main pipe 150 and lateral pipe 151 that utilizes an alternative embodiment of this invention that includes a saddle tee boot 152. A flexible, rectangular saddle 153 on the boot 152 contacts the surface of the main pipe 150 and a hollow tee 154 receives an end of the lateral pipe 151. A rectangular collar 155 overlies the saddle 153. A clamping band 156 circumscribes the main pipe 150 and connects to the collar 155 to apply a force in tension that causes the collar 155 and the saddle 153 to conform to the surface of the main pipe 150 thereby to clamp the saddle 153 against the main pipe 150 in a sealing relationship. As the collar 155 overlies the saddle 153 completely about the periphery of the hollow tee 154, the collar 155 produces a continuous seal about a tap hole or access aperture through the main pipe 150 that aligns with the lateral pipe 151. A clamping band 157 produces a seal between the hollow tee 154 and the lateral pipe 151.

The saddle tee 152 includes many of the structural components of the saddle tee 52 shown in FIGS. 1 through 6. As shown particularly in FIGS. 7 and 8, the hollow tee 154 has an outer right cylindrical surface 160 with spaced circumferentially extending outer ribs 161 and 162 formed remotely from the saddle 153. The ribs 161 and 162 define a circumferential groove 163 for supporting the clamping band 157. The hollow tee 154 has an interior cylindrical surface 164 that is coaxial with an axis 165 that extends between a tap hole in the main pipe 150 and the center of a remote end of the hollow tee 154. The axis 165 is oriented at right angles to the main pipe axis. Other orientation angles can also be used, as previously described.

The hollow tee 154 also may include, in a first hollow section 166 a plurality of circumferentially extending internal rectangular sealing ribs, like the sealing ribs 70, 71 and 72 on the surface 64 in FIG. 2, for engaging the outer surface of the lateral pipe 151.

Like the hollow tee 54 in FIG. 2 and as shown in FIG. 8, the walls of the hollow tee 154 become progressively thicker through a second hollow section 167. This section 167 extends from a location approximately midway along the axis 165 to the saddle 153. This thickening produces an elongated internal tapered section 173 with an end 174 of maximum thickness at the saddle 153. The inner diameter at the end 174 corresponds to the inner diameter of the lateral pipe 151. The tapered section 173 thereby defines a conical surface 175 that reduces the passage along the axis 165 from a diameter corresponding to the outer diameter of a lateral pipe 151 held in the first hollow section 166 to an inner diameter corresponding to the inner diameter of the lateral pipe 151.

As previously described with respect to the tapered section 73 in FIGS. 1 through 6, the tapered section 173 seats an end 176 of the lateral pipe 151 and provides a transition that does not alter the flow characteristics between the main pipe 150 and the lateral pipe 151 even if the hollow tee 154 deforms from a cylindrical state. The tapered section 173 also accommodates variations that can occur in the nominal diameters of a lateral pipe and small angular offsets in the direction of the pipe along the axis 165.

Still referring to FIGS. 7 and 8, the saddle 153, being thin and relatively flexible, can accommodate a wide range of differently sized main pipes. The flexibility of this saddle 153 and the use of the tapered section 173, particularly the stiffening action provided at the thicker ends 174, allows these main pipe variations to occur for wider range of different main pipe sizes. For example, prior art saddle tee assemblies molded for a nominal ten-inch pipe could connect to main pipes in the range of eight to twelve inches without leaking. It has been found that the structure shown in FIGS. 7 and 8 can attach to main pipes in the range of six inches to fifteen inches without leaking.

Still referring to FIGS. 7 and 8, the collar 155 comprises a thin, rectangular metal stamping, preferably of stainless steel, with an aperture 190 that conforms to the outer diameter of the hollow tee 154. The stamping operation forms the collar 155 with substantially the same radius of curvature that is molded into the saddle 153. Each of the ends 191 and 192 of the collar 190 is folded into three layers, shown as layers 193, 194 and 195 in FIG. 9 to stiffen the end 192. As shown in FIGS. 7 and 8, when the collar 155 is positioned, the ends 191 and 192 are circumferentially displaced about the main pipe 150. In this position, the ends 191 and 192 extend along axes parallel to the main pipe axis. As shown in FIGS. 8 and 9, the ends 191 and 192 are disposed circumferentially beyond the collar 155. The ends 191 and 192 therefore do not contact the pipe and the sealing force is more evenly distributed by the remainder of the collar 155 between the ends 191 and 192.

Each of these multiply layered ends 191 and 192 centrally supports tensioning assemblies 201 and 202, respectively, that include standard mechanisms for accepting a clamping band, such as found with conventional hose clamps. Rotation of an actuator 203 or 204 associated with the tension devices 201 and 202 respectively transfers the band 156 through the tension assemblies 201 and 202 to tighten or loosen the band 156.

As shown more specifically in FIG. 9, the tensioning assembly 202 includes a conventional tensioning mechanism 210. A thin planar connector 211, preferably formed by sheet metal stamping, includes, at one end 212 a body portion 213 and four depending tabs 214. The tabs 214 align with apertures 215 through the multiply layered end 192 and are bent to capture the connector 211 to the end 192.

The connector 211 includes an extension portion 216 that receives another clamping structure 222 with a central base 223 and tabs 224 and 225 that capture the structure 222 on the connector 211. The structure 222 carries the tensioning mechanism 202. As will be apparent, the structure of FIG. 9 attaches the tensioning mechanism 202 to the collar 155 without the need for welding or other similar attachment procedures.

As shown in FIG. 8, the main pipe 150 has a tap hole 230 with a diameter that is nominally equal to the inner diameter of the lateral pipe 151. Therefore, as described with respect to the embodiment of FIGS. 1 through 6, the lateral pipe 151 can not extend into the main pipe 150 passage and impede flow characteristics through the main pipe.

As the lateral pipe 151 is installed, it moves along the axis 165 until its end 176 contacts the tapered section 173. Like the saddle disclosed with respect to FIGS. 1 through 6, the elongated tapered section 173 assures that no axial gaps will appear between the end 176 of the lateral pipe 151 and the section 173 because the material at the tapered section 173 deforms around the end 176 of the lateral pipe 151. As previously described, attachment to a main pipe 150 that is not the nominal size causes the hollow tee 154 to deform into an oval shape. However, the tapered section 173 also reduces the forces necessary to restore the cylindrical shape and seal the first hollow section 166 against the lateral pipe 151. That is, it is easier to return the hollow section 166 to a cylindrical form. In addition, the tapered section 173 has sufficient resilience and flexibility to conform to the end 176 of the lateral pipe without forming any gaps at the end 176. Consequently, the tapered section defines a smooth, gap free interconnecting flow passage surface between the end 176 of the lateral pipe 151 and the main pipe 150.

When the saddle tee boot 152 and collar 155 are positioned on the pipe 150, the clamping band 156 is threaded into the tensioning assemblies 201 and 202 and tightened to produce a circumferentially acting force that applies tension to the collar 155. This tensioning force acts as a point force applied to the assemblies 201 and 202. However, the multiply layered ends 191 and 192 distribute these forces across the collar 155. The collar 155 therefore bears evenly against the saddle 153 thereby to conform the entire saddle 153 into a sealing relationship with the main pipe 150. Thus, in this embodiment, as in the embodiment of FIGS. 1 through 6, a single clamping band 156 provides the sealing force.

As previously described, the saddle 155 may seal directly to a main pipe 150 or be sealed with an intermediate thin sealing coat. FIG. 10 depicts a surface 240 of the saddle 153 that provides an improved seal. The surface, in this specific embodiment, is waffled by a series of molded ridges 241 that form shallow rectangular pockets 242. In this form shown in FIG. 10 or any alternate pocketed form, the ridges 241 have improved flexibility and are better able to conform to voids in the main pipe surface. The pockets 242 also coact with any mastic that may be applied to improve the seal between the mastic and the main pipe 150 and between the mastic and the saddle 153.

Figure 11:
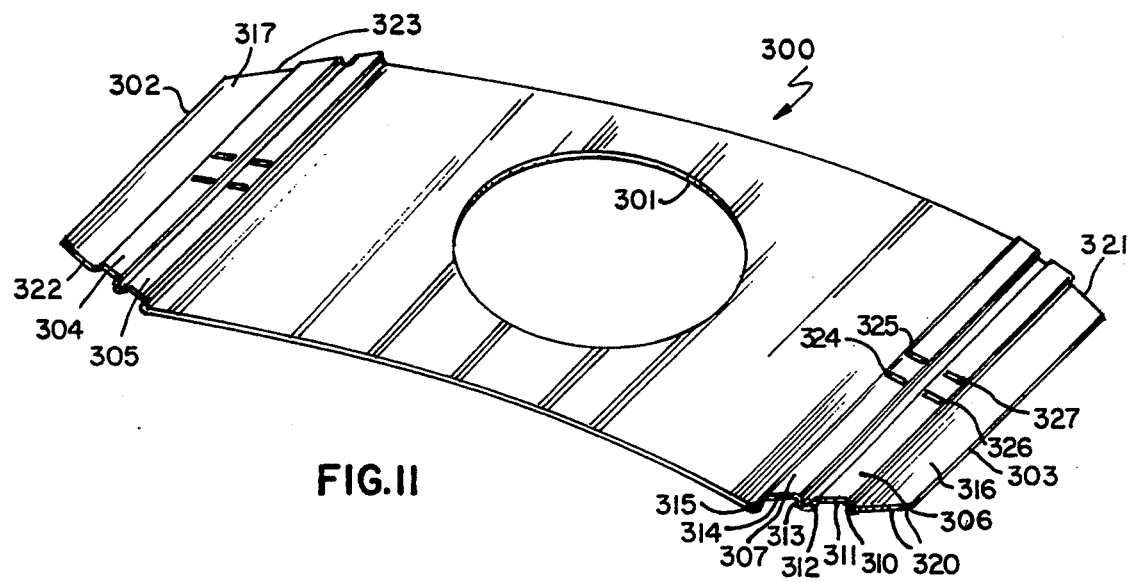
FIG. 11 is a detailed perspective view of an alternative embodiment of a collar for use with a saddle tee assembly.
Figure 12:
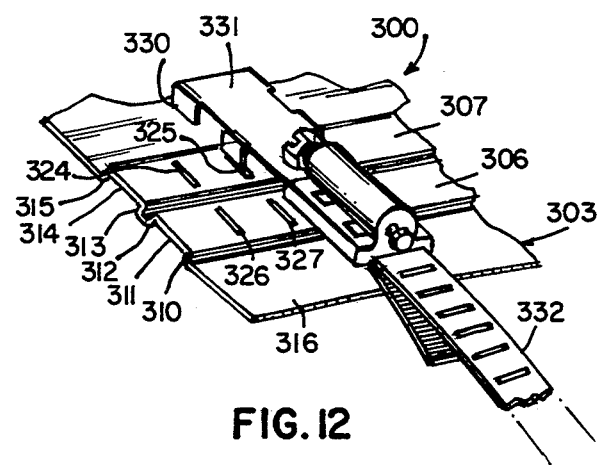
FIG. 12 is a perspective view of the collar on FIG. 11 in an assembled form.

FIGS. 11 and 12 depict the structure of an alternative collar 300 that can be substituted for the collar 155 shown in FIGS. 7 through 10. Like the collar 155, the collar 300 comprises a thin, rectangular metal stamping, preferably of stainless steel, with an aperture 301 that conforms to the outer diameter of the hollow tee, such as the hollow tee 154 shown in FIG. 7. The stamping operation forms the collar 300 with substantially the same radius of curvature that is molded into the saddle 153 (shown in FIG. 7). Each of circumferential ends 302 and 303 is formed with an alternative stiffening structure. In this particular embodiment, each end is formed with a pair of axially extending corrugations shown as corrugations 304 and 305 at the end 302 and corrugations 306 and 307 at the end 303.

Referring specifically to the end 303, the corrugation 306 comprises an oblique offset 310, a central section 311 that is essentially parallel to the surface of the collar 300 and another oblique offset 312. The second corrugation 307 has a similar oblique offset 313, central planar section 314 and oblique offset 315. An extension 316 of the collar 300 lies outside the corrugation 306; there is a similar extension 317 at the end 302. In this particular embodiment the collar 300 has sheared corner portions forming oblique edges 320 and 321 at the termination of the end 303 and similar edges 322 and 323 at the end 302.

The central portions 311 and 314 in the corrugations 306 and 307 are spaced and include centrally located, axially spaced tab apertures 324, 325, 326 and 327 that are organized in a 2×2 matrix to align with mounting tabs 330 on a tensioning assembly 331 in FIG. 12 that is similar to the tensioning assembly 210 shown in FIG. 9.

In the assembled form shown in FIG. 12, the corrugations 306 and 307 provide improved stiffening and sealing along the edge 303, improved even over the stiffening provided by the multi-layered construction shown in FIGS. 7 through 10. Consequently when the tensioning assembly 31 in FIG. 12 tightens, the collar 300, the corrugated ends 302 and 303 distribute the point force applied by the tensioning assemblies and a clamping band 332 so the collar 300 bears evenly against its saddle thereby to conform the entire saddle into a sealing relationship with a main pipe. Thus, a saddle tee assembly constructed in accordance with this invention has all of the desirable characteristics of such assemblies. The combination of the sealing force applied by the clamping band and the adhesive seal produced by the mastic combine to produce a leakproof seal that will withstand a wide variety of pressures from inside or outside the pipes. The use of elastomers for manufacturing the saddle tee boot and stainless steel or similar materials for the collar and clamping bands provide a structure that is essentially impervious to the elements and the environment encountered in such systems. The structure of the saddle tee boot provides a connection that will not impede or otherwise alter the flow characteristics of the pipe system. Moreover, one saddle tee boot sized for a given lateral pipe connects to main pipes of a wide range of different diameters without leaking and without producing gaps in the passage that can accumulate solids and impede flow through the pipes. Consequently, inventory requirements are reduced. Finally, a saddle tee assembly constructed in accordance with this invention is installed easily without any requirements for special tools, materials or procedures.

This invention has been disclosed in terms of certain embodiments. It will be apparent that many modifications can be made to the disclosed apparatus without departing from the invention. For example, the disclosed embodiments of this invention depict a saddle tee assembly in which a hollow tee extends at essentially right angles to a main pipe. As described, alternative angular displacements, such as 45° or 60°, are also possible. The saddle tee assembly is shown as having generally oval and rectangular saddle shapes; other shapes might also be implemented. Specific tensioners and clamping bands are shown; alternative tensioning devices could be substituted. Alternative materials also can be utilized. All these variations and modifications can be made to the specifically disclosed embodiment with the realization of some or all of the advantages of this invention. Therefore, it is the intent of the appended claims to cover all such variations and modifications as come within the true spirit and scope of this invention.

What is claimed as new and desired to be secured by Letters Patent of the United States is:

1. A saddle tee assembly for interconnecting a first pipe of a given size extending along a first axis to a second pipe extending along a second axis with an access aperture formed through a wall thereof wherein the second pipe has a size taken from a range of sizes, said saddle tee assembly comprising:

A. saddle tee boot means formed of a flexible material for interconnecting the first and second pipes, said boot means having a flexible sealing saddle portion for conforming to the surface of a second pipe in the range of sizes surrounding the access aperture and having a hollow tee portion having a first hollow section along the first axis for receiving the first pipe and a second hollow section on the first axis interconnecting said saddle portion and the first hollow section, said second hollow section being internally tapered from the size of the opening through said first hollow portion to the size of the access aperture thereby to produce an elongated internally tapered passage, B. flexible metal collar means for engaging said outer surface of said saddle portion about the periphery of said hollow tee portion, said collar means having first and second positions disposed oppositely of said continuous passage and aligned along a circumference of the second pipe, and C. main clamping means adapted to circumscribe the second pipe and connect to said collar means at said first and second positions for applying a force conforms and seals that said collar means and said saddle portion to the second pipe about the periphery of the access aperture.

2. A saddle tee assembly as recited in claim 1 wherein each of said first and second pipes is cylindrical and said first pipe has given outer and inner diameters, said first hollow section having a diameter corresponding to the outer diameter of the first pipe.

3. A saddle tee assembly as recited in claim 2 wherein the access aperture has a diameter corresponding to the inner diameter of the first pipe and said second hollow section tapers to a diameter at the intersection of said tee extension and said saddle portions that corresponds to the inner diameter of the second pipe.

4. A saddle tee assembly as recited in claim 2 additionally comprising second clamping means for sealing said remote end of said first hollow section to the first pipe, said first hollow section having a circumferential groove for receiving said second clamping means.

5. A saddle tee assembly as recited in claim 4 wherein said first hollow section additionally includes circumferentially extending sealing rib means on an inner surface thereof axially aligned with said circumferential groove for sealing said first hollow section to the first pipe under the action of said second clamping means.

6. A saddle tee assembly as recited in claim 1 wherein said main clamping means comprises a clamping band for circumscribing the second pipe and means for connecting the ends of said clamping band to said collar means, at least one of said connecting means including means for tensioning said clamping band thereby to generate the sealing force on said saddle portion.

7. A saddle tee assembly as recited in claim 6 wherein said collar means includes stiffening end portions that are displaced circumferentially beyond said saddle portion and are parallel with the second axis for stiffening said end portions and wherein said clamp connecting means attach to and through said stiffening end portions.

8. A saddle tee assembly as recited in claim 7 wherein each of said stiffening end portions comprises folded portions of said collar means.

9. A saddle tee assembly as recited in claim 7 wherein each of said stiffening end portions comprises axially extending corrugations formed in said end portions.

10. A saddle tee assembly as recited in claim 1 wherein said boot means is formed of an elastomer and said collar means and said main clamping means are formed of stainless steel and wherein each of said collar means and said saddle portion have an essentially rectangular shape.

11. A saddle tee assembly as recited in claim 10 wherein said collar means is formed as a stamping with a central portion and circumferentially displaced, stiffened end portions.

12. A saddle tee assembly as recited in claim 11 wherein each of said stiffening end portions comprises folded portions of said collar means.

13. A saddle tee assembly as recited in claim 11 wherein each of said stiffening end portions comprises axially extending corrugations formed in said collar means.

14. A saddle tee assembly as recited in claim 1 additionally comprising a water-activated mastic applied to the surface of said saddle portion that contacts the second pipe.

15. A saddle tee assembly as recited in claim 14 wherein each of said first and second pipes is cylindrical and said first pipe has given outer and inner diameters, said first hollow section having a diameter corresponding to the outer diameter of the first pipe.

16. A saddle tee assembly as recited in claim 15 wherein the access aperture has a diameter corresponding to the inner diameter of the first pipe and said second hollow section tapers to a diameter at the intersection of said tee extension and said saddle portions that corresponds to the inner diameter of the second pipe.

17. A saddle tee assembly as recited in claim 15 additionally comprising second clamping means for sealing said remote end of said first hollow section to the first pipe, said first hollow section having a circumferential groove end for receiving said second clamping means.

18. A saddle tee assembly as recited in claim 17 wherein first hollow section additionally includes circumferentially extending sealing rib means on an inner surface thereof axially aligned with said circumferential groove for sealing said first hollow section to the first pipe under the action of said second clamping means.

19. A saddle tee assembly as recited in claim 14 wherein said main clamping means comprises a clamping band for circumscribing the second pipe and means for connecting the ends of said clamping band to said collar means, at least one of said connecting means including means for tensioning said clamping band thereby to generate the sealing force on said saddle portion and said mastic.

20. A saddle tee assembly as recited in claim 14 wherein said collar means includes stiffening end portions that are displaced circumferentially beyond said saddle portion and are parallel with the second axis for stiffening said end portions and wherein said clamping connecting means attach to and through said stiffening end portions.

21. A saddle tee assembly as recited in claim 20 wherein each of said stiffening end portions comprises folded portions of said collar means.

22. A saddle tee assembly as recited in claim 20 wherein each of said stiffening end portions comprises axially extending corrugations formed in said end portions.

23. A saddle tee assembly as recited in claim 14 wherein said boot means is formed of an elastomer and said collar means and said main clamping means are formed of stainless steel and wherein each of said collar means and said saddle portion have an essentially rectangular shape.

24. A saddle tee assembly as recited in claim 23 wherein said collar means is formed as a stamping with a central portion and circumferentially displaced, stiffened end portions.

25. A saddle tee assembly as recited in claim 24 wherein each of said stiffening end portions comprises folded portions of said collar means.

26. A saddle tee assembly as recited in claim 24 wherein each of said stiffening end portions comprises axially extending corrugations formed in said collar means.

27. In a pipe system including a plurality of interconnected pipes including at least one lateral pipe of given internal and external diameters and a main pipe having at least the given exterior diameter that lies in a range of main pipe diameters, the main pipe having a tap hole formed in a wall thereof for the lateral pipe having a diameter corresponding to the interior diameter, an assembly for connecting a lateral pipe to the main pipe at a tap hole comprising:
  A. saddle tee boot means for receiving the lateral pipe, said boot means including:
    i. a flexible saddle portion for conforming to a portion of the surface of the main pipe of any of the range of main pipe diameters surrounding the tap hole, and
    ii. a hollow tee portion extending from said saddle portion for receiving one end of the lateral pipe in a first hollow section remote from said saddle portion, said tee portion having a second, internally tapered section interconnecting said first hollow section and said saddle portion, said internally tapered portion having a diameter corresponding to the lateral pipe interior diameter at said saddle portion and a diameter corresponding to the exterior diameter at the first hollow portion whereby said second section forms a continuously tapered passage therethrough that aligns with the tap hole,
  B. a flexible collar means overlying said saddle portion about the periphery of said hollow tee portion, said collar means having first and second positions disposed oppositely of said continuous passage and aligned along a circumference of the main pipe, and
  C. flexible clamping means being adapted to circumscribe the main pipe and connect to said collar means at said first and second positions for applying a force that conforms and seals said collar means and said saddle portion to the main pipe about the periphery of the tap hole.

28. A pipe system as recited in claim 27 additionally comprising a water-activated mastic compound applied to the surface of said saddle portion that contacts the main pipe.

29. A pipe system as recited in claim 28 additionally comprising second clamping means for sealing said first hollow tee section to the lateral pipe, said first hollow section having a circumferential groove for receiving said second clamping means.

30. A pipe system as recited in claim 29 wherein said first hollow tee section additionally includes circumferentially extending sealing rib means on an inner surface thereof axially aligned with said circumferential groove for sealing said first hollow tee section to the lateral pipe under the action of said second clamping means.

31. A pipe system as recited in claim 28 wherein said flexible clamping means comprises a flexible clamping band for circumscribing the main pipe and means for connecting the ends of said clamping band to said collar means, at least one of said connecting means including means for tensioning said clamping band thereby to generate the sealing force on said saddle portion.

32. A pipe system as recited in claim 28 wherein said collar includes stiffening end portions that are displaced circumferentially beyond said saddle portion and are parallel to the main pipe axis and wherein said clamping connecting means attach to and through said stiffened end portions.

33. A saddle tee assembly as recited in claim 32 wherein each of said stiffening end portions comprises folded portions of said collar means.

34. A saddle tee assembly as recited in claim 32 wherein each of said stiffening end portions comprises axially extending corrugations formed in said collar means.

35. A pipe system as recited in claim 28 wherein said main pipe lies along a main pipe axis, said boot means is formed of an elastomer and said collar means and said main clamping means are formed of stainless steel and wherein each of said collar means and said saddle portion having an essentially rectangular shape.

36. A pipe system as recited in claim 33 wherein said collar means is formed as a stamping with a central portion and circumferentially displaced stiffening end portions for supporting said main clamping means.

37. A saddle tee assembly as recited in claim 36 wherein each of said stiffening end portions comprises folded portions of said collar means.

38. A saddle tee assembly as recited in claim 36 wherein each of said stiffening end portions comprises axially extending corrugations formed in said collar means.

* * * * *